United States Patent
Kadakia et al.

(10) Patent No.: US 8,885,457 B2
(45) Date of Patent: Nov. 11, 2014

(54) SYSTEMS AND METHODS OF IMPROVING THE QUALITY OF VOIP COMMUNICATIONS

(75) Inventors: Nirav Kadakia, Holmdel, NJ (US); Chakrapani Gorrepati, Holmdel, NJ (US); Vishal Patel, Holmdel, NJ (US); Zhiyu Guo, Holmdel, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 156 days.

(21) Appl. No.: 13/087,557

(22) Filed: Apr. 15, 2011

(65) Prior Publication Data

US 2011/0255397 A1 Oct. 20, 2011

Related U.S. Application Data

(60) Provisional application No. 61/324,518, filed on Apr. 15, 2010.

(51) Int. Cl.
*H04L 12/26* (2006.01)
*H04L 12/24* (2006.01)
*H04L 29/06* (2006.01)

(52) U.S. Cl.
CPC ......... *H04L 41/0672* (2013.01); *H04L 43/0835* (2013.01); *H04L 65/80* (2013.01); *H04L 43/087* (2013.01); *H04L 65/1053* (2013.01)
USPC .......................................... 370/216; 370/338

(58) Field of Classification Search
USPC ......................................... 370/216–222, 338
See application file for complete search history.

(56) References Cited

U.S. PATENT DOCUMENTS

| 6,370,656 B1 | 4/2002 | Olaring et al. |
| 7,953,840 B2 | 5/2011 | Liao et al. |

(Continued)

FOREIGN PATENT DOCUMENTS

EP 1 107 519 2/2005

OTHER PUBLICATIONS

International Search Report issued in PCT/US2011/032639 on Jul. 20, 2011.
Written Opinion issued in PCT/US2011/032639 on Jul. 20, 2011.

*Primary Examiner* — Gary Mui
(74) *Attorney, Agent, or Firm* — Nixon & Vanderhye, P.C.; Joseph Pagnotta

(57) ABSTRACT

Methods of addressing problems in a voice over Internet protocol (VOIP) telephony system include collecting data on network events, analyzing the data, and taking corrective action when possible. If an IP telephony device is registering with the VOIP telephony system more frequently than necessary, which can indicate the IP telephony device is unnecessarily jumping between proxy services, the IP telephony device is instructed to re-initialize itself. If an IP telephony device sends two successive stay alive registration messages to a proxy server from different ports of a router, which can indicate that a router pinhole is closing between stay alive messages, then the IP telephony device is instructed to send stay alive registration messages more frequently. If data packet statistics indicate that an IP telephony device is experiencing a jitter problem, the IP telephony device is instructed to increase the size of a data buffer for incoming data packets. If data packet statistics indicate that an IP telephony device is experiencing an enduring bandwidth problem or an enduring data packet loss problem, the IP telephony device is instructed to adopt a new encoding algorithm with greater data compression.

24 Claims, 8 Drawing Sheets

(56) References Cited

U.S. PATENT DOCUMENTS

| | | |
|---|---|---|
| 8,144,587 B2 * | 3/2012 | Heinz et al. ............... 370/235 |
| 2003/0086372 A1 | 5/2003 | Pate et al. |
| 2005/0068907 A1 | 3/2005 | Garg et al. |
| 2005/0281204 A1 | 12/2005 | Karol et al. |
| 2007/0070990 A1 | 3/2007 | Chong et al. |
| 2007/0195764 A1 | 8/2007 | Liu et al. |
| 2008/0155076 A1 | 6/2008 | Liao et al. |
| 2009/0007220 A1 | 1/2009 | Ormazabal et al. |

* cited by examiner

US 8,885,457 B2

SYSTEMS AND METHODS OF IMPROVING THE QUALITY OF VOIP COMMUNICATIONS

CROSS-REFERENCE TO RELATED APPLICATIONS

This application claims priority to U.S. Provisional Application Ser. No. 61/324,518, which was filed Apr. 15, 2010, the entire contents of which is hereby incorporated by reference.

BACKGROUND

1. Field of the Technology

The technology is related to systems and methods that monitor and analyze network events occurring within a Voice over Internet Protocol (VOIP) system to detect conditions that could result in poor call quality. The technology is also related to methods of automatically taking corrective action to correct detected problems.

2. Background of the Technology

VOIP telephony systems are used to transmit voice communications over a data network using Internet Protocol digital data packets. VOIP telephony systems can supplement and/or replace existing analog telephone systems. In VOIP systems, analog voice signals are converted into digital data packets which traverse the data network, and the data packets are then converted back into voice signals.

In order to conduct a VOIP telephone call, the calling party must have an IP telephony device which is capable of converting analog voice signals into digital data packets and transmitting the data packets over the Internet. The IP telephony device must also be capable of receiving data packets from a third party and converting those data packets into analog voice signals which are played to the user.

IP telephony devices can take many different forms. An IP telephone could resemble a normal analog telephone, but the IP telephone would be capable of sending and receiving a call in the form of digital data packets. An IP telephony device could also be embodied in a computer with a microphone and a speaker, where the computer is running software that enables the computer to conduct IP based telephone calls. An IP telephony device could also be a mobile telephony device capable of communicating via either a cellular telephony network, or via wireless digital data communications. In the following description, reference is made to IP telephony devices. The term "IP telephony device" is intended to cover any physical device and any associated software which enable a user to conduct an IP based telephone call.

It is also possible for a user to interact with a VOIP telephony system using a normal analog telephone. In these instances, an interface device is provided between the data network and the analog telephone. The interface device converts analog telephone signals from the analog telephone into digital data packets that traverse the data network. Also, the interface device converts incoming digital data packets into analog signals that can be used by the analog telephone. Thus, the term "IP telephony device" is also intended to encompass the combination of an analog telephone and an interface device.

IP telephony devices are typically connected to the Internet, or to some other data network, through some type of router device. In one common scenario, a residential customer will have a high speed broadband Internet connection that runs into the customer's house and which terminates at a router. The router, in turn, is connected to a local network within the customer's house. The IP telephony device used to conduct VOIP telephone calls is then connected to the local network, or directly to the router itself. The router is used to provide a high speed Internet connection to not only the IP telephony device, but also to computers, and possibly to an entertainment system such as a cable television set top box. Thus, the IP telephony device must share access to the Internet connection provided by the router.

Typically, only a single IP address is assigned to the router. Because multiple devices within the user's home or office share access to the Internet connection, it is necessary for the router to conduct some sort of network address translation so that all of the devices within the customer's home or office can share the single IP address assigned to the router.

In addition, the router will also typically include some type of firewall software which is used to prevent unauthorized data packets from entering the local network and being delivered to the devices connected to the local network. As will be explained in more detail below, the firewall and the network address translation systems used by the router can make it difficult to establish and maintain a VOIP telephone call to an IP telephony device connected to the router or the local network.

In order to conduct a high quality VOIP telephone call, both the originating IP telephony device and the destination IP telephony device must be able to transmit and receive a certain number of data packets each second. If sufficient communications bandwidth is not available, the call quality will be degraded. Likewise, if data packets sent between the two IP telephony devices are lost in transit, or if the data packets arrive too far out of sequence, the call quality is degraded.

Insufficient bandwidth problems can occur when an IP telephony device is sharing access to a broadband Internet connection with other devices, and those other device consume too much of the available bandwidth. Depending on the circumstances, the other devices on the local network could substantially continuously consume too much of the available bandwidth, or the other devices might only periodically consume too much of the bandwidth.

For instance, if a cable set-top box in a customer's home is streaming a movie to a display screen, the streaming of the movie might continuously consume so much of the available bandwidth that any VOIP calls suffer degraded call quality. On the other hand, if a computer located in the customer's home only periodically downloads large files, the computer would only periodically consume too much of the available bandwidth. As a result, a VOIP call being conducted while the computer conducts a download would only temporarily experience degraded call quality. As soon as the file is fully downloaded to the computer, the call quality would return to normal.

DETAILED DESCRIPTION OF PREFERRED EMBODIMENTS

In a typical VOIP telephony system, various system assets will all be connected to the Internet. The system assets can include the IP telephony devices used by customers to conduct VOIP telephone calls. The system could also include various network servers which are used to register the IP telephony devices maintained by the customers, and which can be used to implement telephone calls between those IP telephony devices. A VOIP telephony system may further include quality monitoring devices which are used to monitor the quality of telephone calls placed between individual pairs of the IP telephony devices maintained by the customers.

The disclosed systems and methods involve monitoring actions or data traffic occurring within a VOIP telephony system to identify conditions that may result in degraded call quality or that may result in the unnecessary consumption of bandwidth by unnecessary signaling between devices. When such conditions are identified, and where it is possible to take corrective action, one or more elements of the VOIP telephony system or an IP telephony device take corrective action to alleviate the problem.

Figure 1:
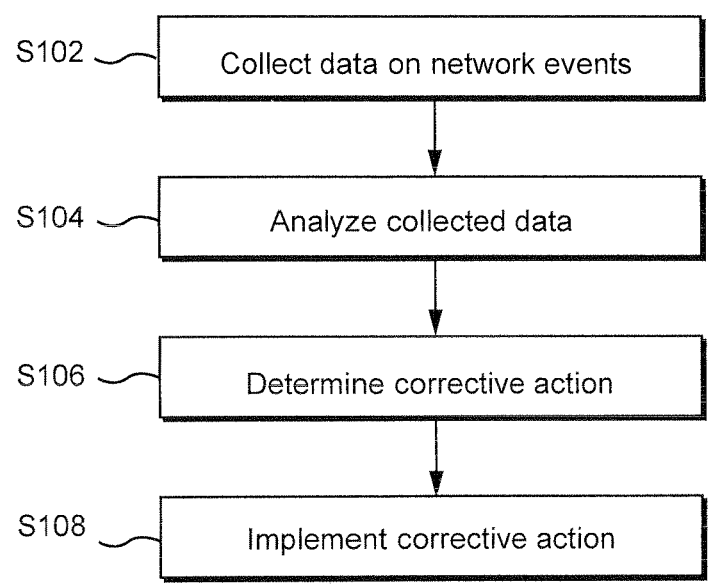
FIG. 1 is a flowchart showing steps of a method for detecting and correcting problems with a VOIP telephony system.

FIG. 1 illustrates a generalized method embodying the invention. Individual implementations of this method can take multiple different forms. However, as illustrated in FIG. 1, the method includes a first step S102 of collecting data on network events. This can include monitoring communications which are passing back and forth between the IP telephony devices maintained by the customers. This step could also include monitoring various call quality measures such as data packet loss and jitter statistics. Further, this step could include collecting trouble reports which are generated by the IP telephony devices and which are sent to a central registration authority. Still further, this step could include monitoring or reviewing information about occurrences of an IP telephony device registering with the VOIP telephony system.

In step S104 the collected data is analyzed to determine if problems may be occurring on the network. As will be explained more fully below, the analysis step could take many different forms. In some instances, the analysis might be a comparison of an actual measured value or an average of measured values to some predetermined threshold value. In other instances, if a particular type of event has occurred, the fact that the event has occurred may be indicative of an actual or potential problem. In still other instances, a variety of different forms or items of data could be collected and analyzed together to determine if a problem has occurred or if one is likely to occur.

In step S106 the system determines whether it would be possible to take corrective action to remedy an actual or potential problem. The method also includes step S108 where corrective actions are implemented in an attempt to correct the problem. As will be described more fully below, the step of determining whether to take corrective action and the step of actually taking that corrective action can take on a wide variety of different forms depending on the type of trouble which has been identified in the analysis step.

An IP telephony device may share access to the Internet through a router. As also mentioned above, the fact that such a router must implement network address translation procedures and the fact that the router includes a firewall can lead to a variety of different problems with connecting and maintaining IP telephone calls. To better understand the problems which can occur, we will first describe a process which occurs when an IP telephony device registers with an IP telephony system with reference to FIG. 2.

When an IP telephony device is first powered on and connected to the Internet, the IP telephony device will utilize the Internet connection to contact a server maintained by the IP telephony system. In step S202, the IP telephony device obtains profile information from the server. The profile information could include the IP telephony device's telephone number, various other configuration data items, and possibly a password or authorization code which the device can use to register with the IP telephony system. The profile information can also include a listing of proxy servers which the device is authorized to contact in order to conduct a registration process. The proxy server group would typically include multiple proxy servers which are located in different geographical locations.

In step S204, the IP telephony device selects one of the proxy servers provided in the profile information and the IP telephony device sends a registration request message to that proxy server. In step S206, the proxy server sends back a challenge message to the IP telephony device asking the IP telephony device to provide special identification information which will allow the proxy server to authenticate the IP telephony device as authorized to conduct communications on the IP telephony system.

In step S208 when the IP telephony device receives the challenge message from the proxy server, the IP telephony device creates a digital signature and the digital signature is sent back to the proxy server with a response to the challenge message. The digital signature created by the IP telephony device could be generated using the password or authentication code that the IP telephony device received as part of its profile information. The digital signature could also be based upon information sent in the challenge message from the proxy server. Various other items of information could also be encoded into the digital signature to uniquely identify the IP telephony device and also to indicate that it is authorized to conduct communications on the IP telephony system.

In step S210, the proxy server itself creates a digital signature using the same pieces of information discussed above. The proxy server compares the digital signature received from the IP telephony device to the digital signature that it created. In step S212, if the two digital signatures match, this would indicate that the IP telephony device should be authorized to conduct communications through the IP telephony system. Accordingly, in step S212, the proxy server would send an OK message back to the IP telephony device indicating that the digital signatures have matched and that the IP telephony device is now authorized to begin communications.

As mentioned above, in many cases, an IP telephony device used to conduct an IP telephone call is sharing access to the Internet through a router. The router itself provides certain firewall functions to prevent unauthorized data communications from being passed from the Internet to individual devices within a customer's home or office. One common way in which those firewall systems operate relates to the generation of a "pinhole." The term "pinhole" refers to a time based mechanism for allowing certain data packets to be passed from the Internet back to devices on a customer's local network.

Basically, each time that a local device on the local network within the customer's home sends a data packet through the router to a destination device on the Internet, the router will note the IP address of the destination device, as reflected in the data packet, and the router will start a timer. For a certain predetermined period of time after that data packet has been sent, the router will allow data packets from the destination device to be sent back to the local device on the local network in the customer's home. However, once this predetermined time period has expired, the router will block the delivery of any additional data packets sent from the destination device. In many commonly used commercial routers, the predetermined time period is approximately thirty seconds. The thirty second time window during which data packets can be received by the local router is commonly called a "pinhole."

In the context of a VOIP telephony system, it is necessary for a proxy server or other system assets of the IP telephony system to be able to send messages to the IP telephony device on the local network in the customer's home at all times so that when there is an incoming call, the IP telephony device can be connected to that call. Unfortunately, if the IP telephony device has not recently sent a data packet to the device attempting to connect an incoming call, any data packets sent from the device in an attempt to establish the incoming call are blocked by the router.

To prevent this from occurring, most IP telephony devices are configured so that they periodically send a "stay alive" message to the IP telephony system. The period of time that elapses between those stay alive messages is carefully configured to be smaller than the predetermined period of time that the router uses to cut off incoming data communications. For instance, if a router's firewall system is designed to cut off incoming data communications after 30 seconds, then the IP telephony device will be configured to send a stay alive message to the IP telephony system every 20-25 seconds to ensure that the IP telephony system is always able to send a data packet back to the IP telephony device when it is necessary to set up a new incoming telephone call. Periodically sending the stay alive messages continuously re-sets the router's timer for a pinhole so that the pinhole remains open.

Figure 2:
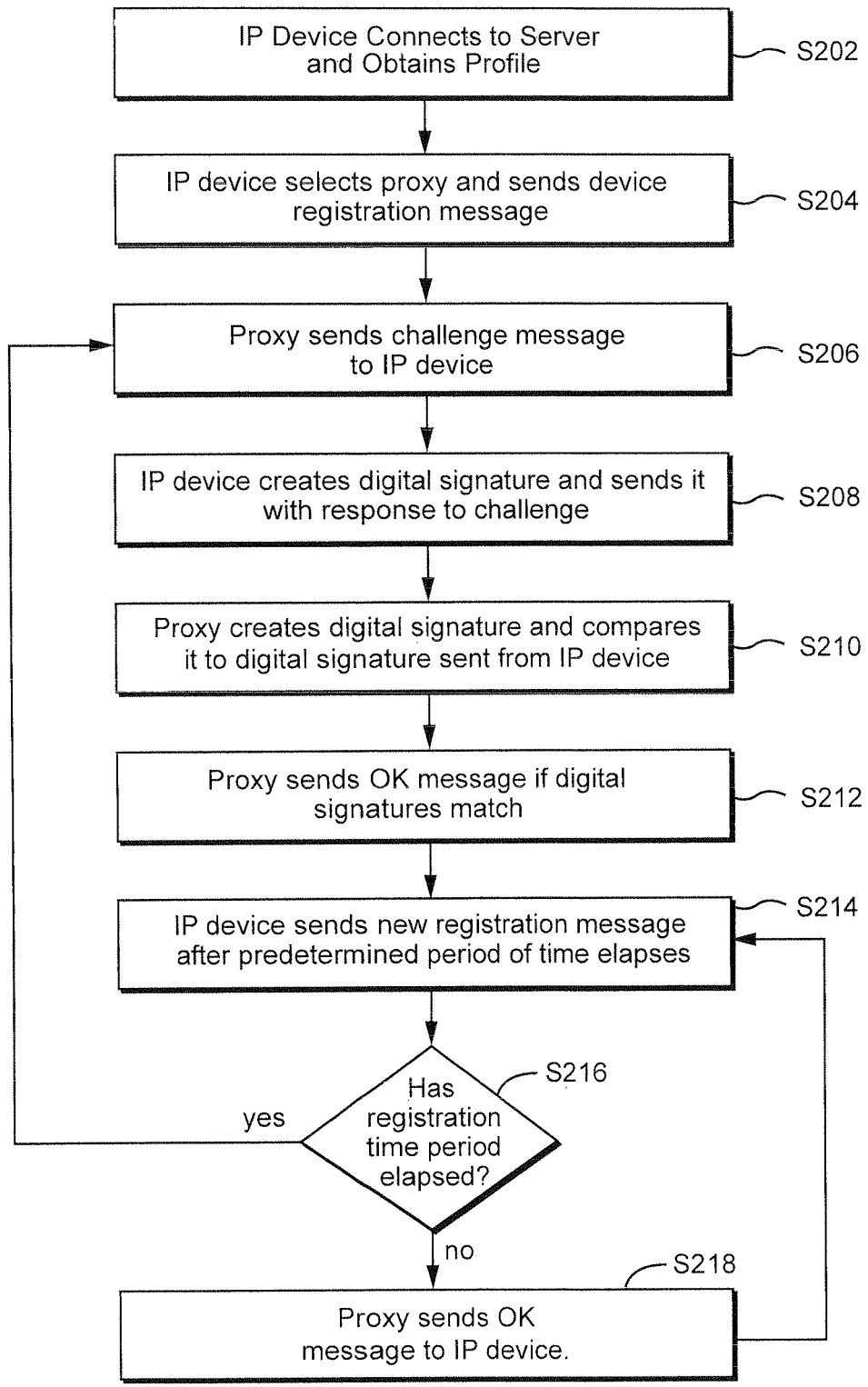
FIG. 2 illustrates steps of a method of registering an IP telephony device with a VOIP telephony system.

Returning to a discussion of the method illustrated in FIG. 2, once the proxy server has sent an OK message in step S212 to indicate that the IP telephony device is authorized to conduct communications over the IP telephony system, the process moves on to step S214. In step S214, the IP telephony device sends a new registration request message after a predetermined period of time has elapsed. As explained above, the predetermined period of time will be shorter than the period of time at which a router will close the pinhole and cut off incoming data communications from the proxy server.

The transmission of this new registration message causes the router at the customer's home or office to reset the pinhole timer. The proxy server, knowing that the IP telephony device has recently registered, treats the new registration request message from the IP telephony device as a "stay alive" message. In other words, when this new registration request message is received from the IP telephony device, the proxy sever will not force the IP telephony device to again go through the whole registration process described above. Instead, if the IP telephony device has recently gone through the registration process, the proxy sever will simply send back an OK message.

The initial registration of the IP telephony device will typically remain valid for only a predetermined period of time on the order of less than one day. Once that predetermined registration time period has elapsed, the system will force the IP telephony device to re-register with the system—meaning once again going through the full registration process to ensure that the IP telephony device is still a valid device which is authorized to conduct communications on the IP telephony system.

Accordingly, in step S216 of the method illustrated in FIG. 2, when the proxy server receives a registration message from an IP telephony device after the device has already been registered, the proxy server will check to determine how long it has been since the IP telephony device conducted its last full registration. If that full registration process was relatively recent, and the registration time period has not expired, the method will proceed to step S218 and the proxy server sends an OK message back to the IP telephony device. The method will then loop back to step S214, and the IP telephony device waits for the predetermined time period (20-25 seconds) to elapse before sending a new registration request (stay alive) message back to the proxy server. Steps S214, S216 and S218 will continue to occur until the full registration time period has elapsed.

In some IP telephony systems, an IP telephony device will be able to maintain a valid registration with the system for a period of approximately eight hours. At the end of the eight hour registration time period, it will be time for the IP telephony device to conduct a new full registration process. Accordingly, when the proxy server determines in step S216 that the IP telephony device's registration time period has expired, the method will loop back to step S206. The proxy server sends a regular challenge message to the IP telephony device requesting that the IP telephony device conduct a full new registration process. The method then proceeds through the registration steps as explained above.

In one embodiment of the invention, if there are no problems with the IP telephony system or with the IP telephony device, the IP telephony device will go through the full registration process once every eight hours, and the IP telephony device will continue to send stay alive messages to the proxy server once every 20-25 seconds. However, there are multiple different problems which can occur with the devices themselves or with the data communications. Any one of these problems can result in blocked calls or the inability of an IP telephony device to receive an incoming telephone call.

In some instances, a software bug or other physical difficulties with an IP telephony device can cause the IP telephony device to send its periodic stay alive messages to a proxy server other than the one with which the IP telephony device originally registered. In other words, a first stay alive message will be sent to a first proxy server with which the IP telephony device initially registered, and a second subsequent stay alive message will be sent to a second proxy server. When the second proxy server receives the stay alive message, the second proxy server will not recognize the IP telephony device as having already been registered. As a result, the second proxy server sends back a challenge message which requires the IP telephony device to conduct a new full registration process. The IP telephony device will go through the registration process described above with the second proxy server, and the IP telephony device will then send stay alive messages to the second proxy server.

If IP telephony devices are only required to re-register with their proxy server once every 8 hours, then one should only see that a particular IP telephony device has registered with the system three times in every 24 hour period. If the registration records for a particular IP telephony device show that the IP telephony device is registering with the system more than three times in each 24 hour period, this means that the IP telephony device is jumping from one proxy server to another before the normal eight hour registration time period expires. Such a condition is indicative of a problem with the software on the IP telephony device or a physical problem with the IP telephony device.

Because the IP telephony device is still registering with at least one proxy server on the system, it will still be possible for the device to receive incoming telephone calls. However, the fact that the IP telephony device is sending successive stay alive messages to different proxy servers, and then jumping from one proxy server to another, indicates that there is likely a problem with the IP telephony device itself. And this problem may not be limited to just sending stay alive messages to different proxy servers.

The IP telephony system can record each time that an IP telephony device registers with the system. This could include maintaining a continuous log of all registrations conducted by the IP telephony device, or maintaining a record of all registrations that occurred for the IP telephony device over a predetermined period of time, such as one day. The IP telephony system can then check these records to determine if an IP telephony device appears to be registering too often. When this problem is detected, the IP telephony system can instruct the IP telephony device to re-initialize or reboot itself in an attempt to correct the problem. Often, a simple reboot of the IP telephony device will cure the problem.

The system can instruct the device to re-initialize or reboot itself during a point in time when it is highly unlikely that the customer would desire to place or receive a telephone call. For instance, the IP telephony system could instruct the IP telephony device to reboot itself at 4:00 am local time. Once the IP telephony device has rebooted, it will conduct the method illustrated in FIG. 2, where a normal registration process is conducted, and the IP telephony device begins sending out periodic stay alive messages.

Another problem which can occur is reflected in the originating IP address of the stay alive messages sent from an IP telephony device. If an IP telephony device is sending its stay alive messages through a router, the router will insert its assigned IP address into the data packets before the stay alive messages are sent on to the proxy server. However, in some instances, successive stay alive messages sent from an IP telephony device will reflect different originating IP addresses. This can occur for a variety of different reasons.

For instance, if the router forwarding the stay alive messages for an IP telephony device temporarily became disconnected from the Internet, when the router re-connects, it will be assigned a new IP address. Thus, the next time that the router forwards a stay alive message from the IP telephony device on to the proxy server, the stay alive message will indicate a different originating IP address than the one contained in the last stay alive message sent from the IP telephony device.

To ensure that there are no problems, whenever a proxy server determines that successive stay alive messages received from an IP telephony device have come from different originating IP addresses, the proxy server will request that the IP telephony device conduct a full new registration process. Alternatively, the proxy server may instruct the IP telephony device to re-initialize or reboot itself, which will also cause the IP telephony device to conduct a full registration process.

Another problem that can occur relates to the time interval between successive stay alive messages sent from an IP telephony device. As explained above, a router will maintain a pinhole for a particular IP telephony device for a certain predetermined period of time. If the IP telephony device does not send a new stay alive message to its proxy server within that predetermined period of time, the pinhole will be closed. If the router closes the pinhole before the IP telephony device sends out its next stay alive message, there will undesirably be a certain period of time when it is impossible for the proxy server of the IP telephony system to contact the IP telephony device.

In most commercially available routers, the pinhole will be kept open for at least 30 seconds, and sometimes for periods as long as five minutes. Because thirty seconds is typically the shortest duration for pinholes, most IP telephony devices are configured to send out stay alive messages every 20 to 25 seconds, which ensures that the pinhole remains constantly open.

In some instances, however, a router might be configured to close a pinhole after less than 30 seconds. To avoid situations where a router is closing the pinhole before the IP telephony device can send out its next stay alive message, it is possible to adjust the frequency with which the stay alive messages are sent. But before this is done, it is necessary to know that the problem exists in the first place.

Each of the stay alive messages sent by the IP telephony device will reflect the UDP port of the router to which the IP telephony device is connected. If the router never closes the pinhole, successive stay alive messages will always reflect the same UDP port. However, if a router is closing the pinhole before the IP telephony device can send out its next stay alive message, then the next time the IP telephony device sends a stay alive message, the stay alive message will likely reflect a different UDP port. Thus, if successive stay alive messages received by the proxy server reflect different UDP port numbers, this indicates that pinhole is being closed between each stay alive message.

If the proxy server determines that the port number of successive stay alive messages has changed, the system can then signal the IP telephony device to increase the frequency with which the stay alive messages are sent. In other words, the time period that elapses between the transmission of successive stay alive message is shortened. The IP-based telephony system will continue to instruct the IP telephony device to shorten the time period between stay alive messages until successive stay alive messages all reflect the same UDP port number. So long as the system notes that the stay alive messages are all coming from the same port, this provides an indication that the stay alive messages are being sent before the pinhole is closed.

Figure 3:
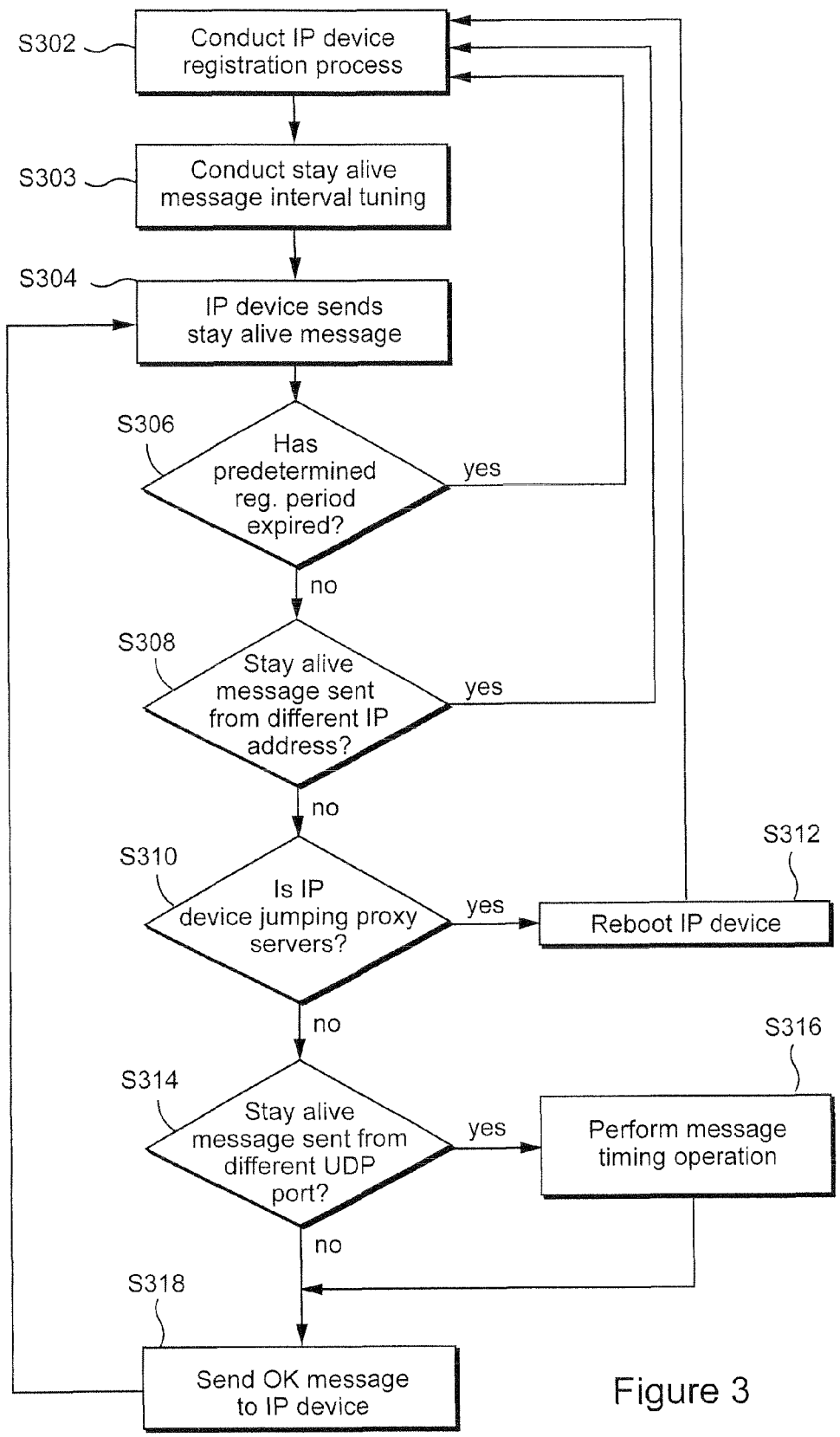
FIG. 3 illustrates steps of a method of detecting and correcting problems with an IP telephony device connected to a VOIP telephony system

FIG. 3 illustrates steps of a method which combine all of the above-identified problem detection and corrective actions. A brief description of the overall process follows.

In step S302, a newly connected IP telephony device conducts a normal registration process as has been described with reference to FIG. 2. Next, in step S303, a tuning process is conducted to adjust the frequency with which the stay alive messages are sent from the IP telephony device. This process will be discussed in more detail below. However, the purpose of the tuning step is to adjust the duration of the time interval between successive stay alive messages to reduce unnecessary messaging traffic while still ensuring that the router never closes the pinhole.

Next, in step S304, the IP telephony device sends its first stay alive message after registration and tuning. In step S306, the proxy server determines if the predetermined registration time period for the IP telephony device has expired. As noted above, it would be typical for a registration time period to expire once every 8 hours. In step S306, if the proxy server determines that the registration time period has expired, the method returns to step S302 where the IP telephony device is required to conduct another full registration process. If the predetermined registration time period has not yet expired, the method continues to step S308.

In step S308, the proxy server determines if the current stay alive message for the IP telephony device has been sent from a different IP address than a previous stay alive message. As explained above, if this has occurred, it may be indicative of a problem. Accordingly, if this has occurred, the method returns to step S302, and the IP telephony device is required to conduct another full registration process. If the current stay alive message has been received from the same IP address as the previous stay alive message, the method continues to step S310.

In step S310, the proxy server checks to determine if the IP telephony device appears to be jumping proxy servers. As noted above, this can be determined by checking the number of times that the IP telephony device has registered with the IP telephony system over a predetermined period of time. As mentioned above, if the IP telephony device is jumping proxy servers, this could be indicative of a software or device problem. If this has occurred, the method proceeds to step S312 where the IP telephony device is instructed to reboot itself. The instruction can be an instruction to immediately reboot. In this case, the method proceeds on to step S302 where the device conducts a new registration process. The instruction to reboot could also be an instruction to conduct the reboot process at some specified time in the future. In that case, the method might simply proceed on to step S314. Also, if this check does not indicate that the device is jumping proxy servers, the method proceeds to step S314.

In step S314, the proxy server checks to determine if the current stay alive message indicates the same UDP port of the router as the previous stay alive message. If the port number has changed since the previous stay alive message, this can indicate that the router is closing the pinhole between successive stay alive messages. Accordingly, if this has occurred, in step S316, the IP telephony device is instructed to perform a message timing operation.

In one embodiment, the message timing operation will decrease the time interval between successive stay alive messages, as described below with reference to FIG. 4. In other embodiments, the message timing operation can increase or decrease the time interval between stay alive messages to improve message traffic overhead efficiency as described below with reference to FIG. 5.

The method then moves on to step S318. In alternate embodiments, after the time interval between successive stay alive messages has been adjusted, the IP telephony device is instructed to conduct another full registration process. In step S314, if the current stay alive message indicates the same port number as the preceding stay alive message, the method moves on to step S318, where the proxy server sends an OK message to the IP telephony device. The method then moves back to step S304, where the IP telephony device sends another stay alive message after a short predetermined period of time has elapsed.

Although the method illustrated in FIG. 3 includes multiple different checks to determine if problems have occurred and multiple different corrective actions if a potential problem (i.e., a communication fault) has been noted, an individual method embodying the technology need not include all of these steps. One or more of these steps could be omitted. Further, additional checks could be performed and additional corrective actions could be taken.

In step S316 of the method described above, a message timing operation is performed. If the system has noticed that there is a problem with the timing interval between successive stay alive messages, and that a router connected to the IP telephony device is closing the pinhole between successive stay alive messages, one solution is to decrease the time interval between successive stay alive messages. However, each stay alive message and the corresponding response from the associated proxy server represent overhead messaging traffic that the system must bear to keep the system operating properly. These messages do nothing to carry actual telephone calls. The messaging traffic associated with the stay alive messages and the replies from the proxy servers simply ensure that the IP telephony system is always able to reach the IP telephony device.

Because the stay alive messages and the replies from the proxy servers are only overhead, it is desirable to generate them as seldom as possible and still keep the system operating properly. For this reason, when it becomes necessary to adjust the interval between successive stay alive messages, it is desirable to also ensure that the stay alive messages are only sent as often as strictly necessary to ensure that the router keeps the pinhole open. The method illustrated in FIG. 4 is designed to accomplish this purpose.

In step S402, the IP telephony system instructs the IP telephony device to decrease the interval between successive stay alive messages. But the system would only instruct that the interval be reduced by a very small amount—perhaps one second or less. In step S404, the system waits to receive at least two successive stay alive messages that have been sent with the new timing interval.

In step S406, the system checks to determine if the same UDP port is reflected in both stay alive messages. If so, this indicates that the timing interval has been adjusted to a small enough time period so that the router will no longer close the pinhole between successive stay alive messages. If not, the method loops back to step S402, and the IP telephony device is again instructed to further reduce the timing interval between successive stay alive messages by another small amount. This process continues until the system determines in step S406 that successive stay alive messages reflect the same UDP port, which indicates that the problem has been solved.

Figure 4:
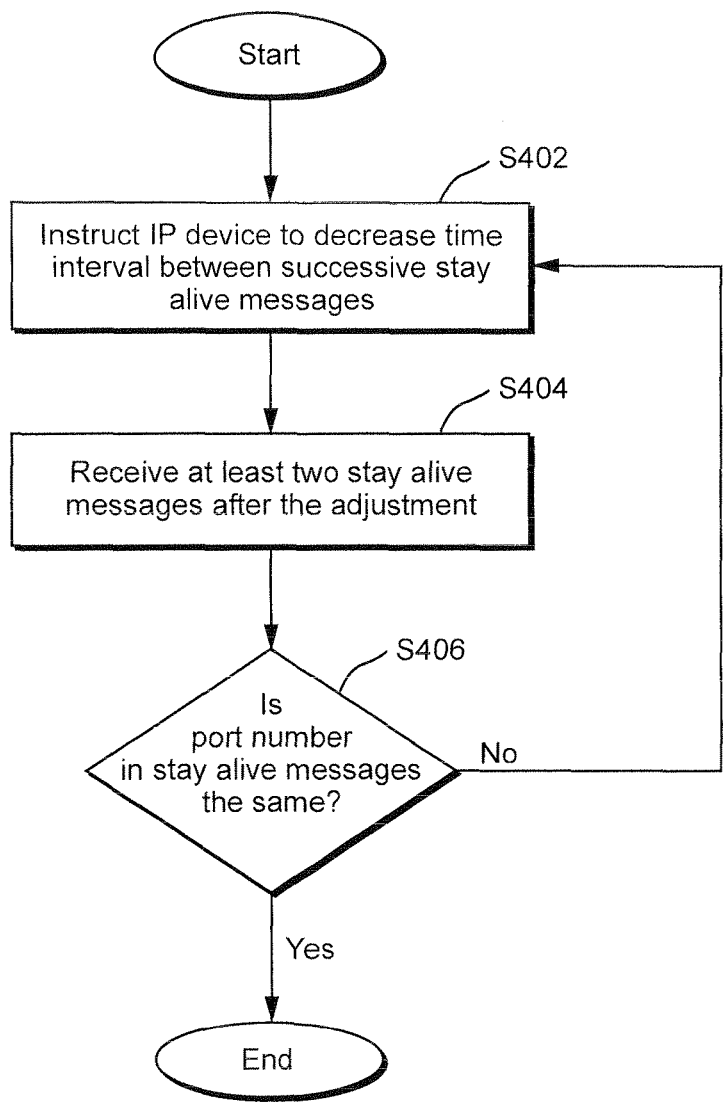
FIG. 4 illustrates steps of a method that can be used to adjust a timing interval between stay alive messages sent from an IP telephony device.

A method as illustrated in FIG. 4 ensures that any problem with the pinhole closing is solved, and that the interval between successive stay alive messages is kept as long as possible. This minimizes the amount of overhead caused by these messages so far as is possible.

Figure 5:
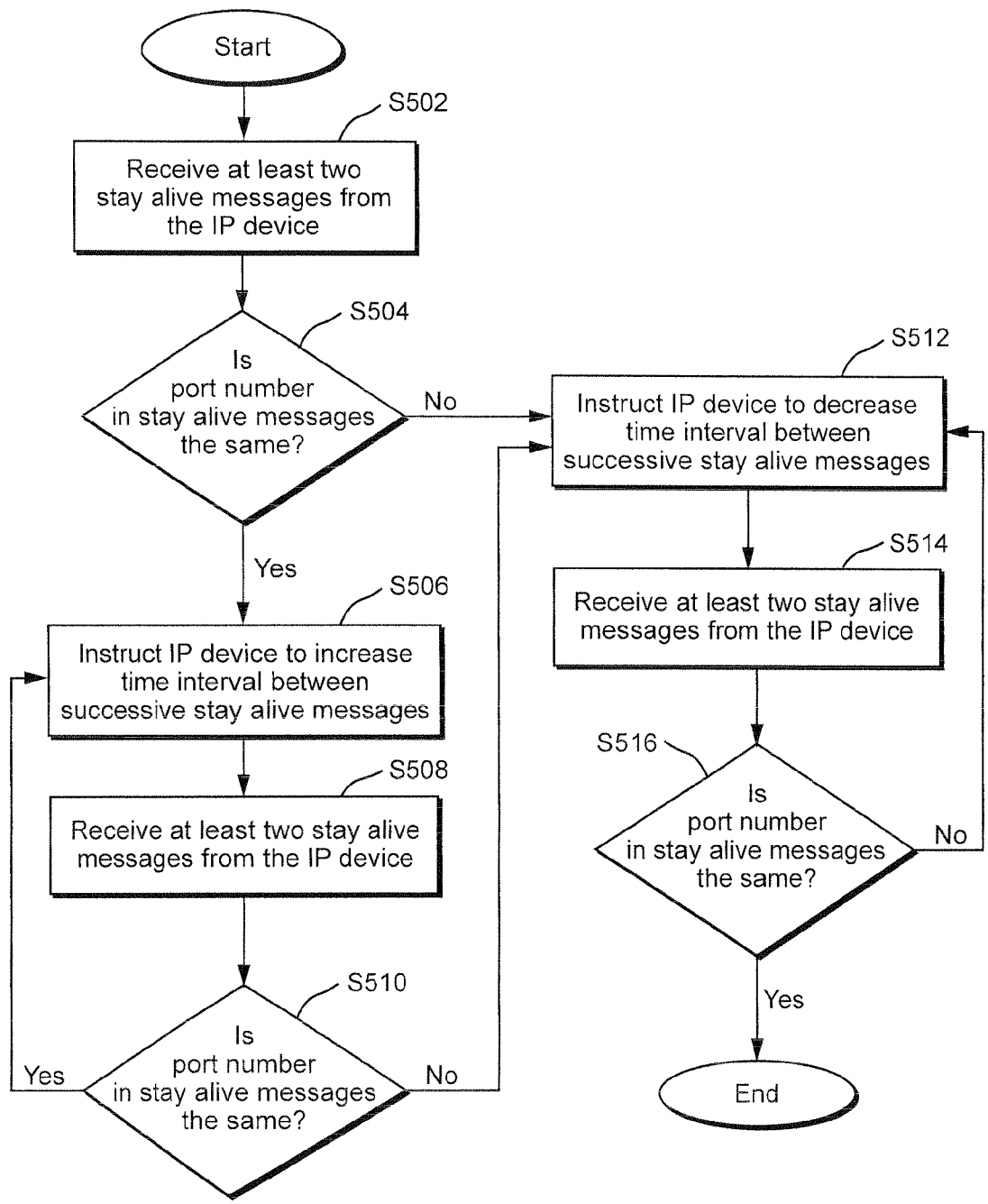
FIG. 5 illustrates steps of another method that can be used to adjust a timing interval between stay alive messages sent from an IP telephony device.

FIG. 5 illustrates steps of a method which can be used to adjust the timing of the stay alive messages to potentially reduce the amount of overhead created by the stay alive messages and the corresponding OK messages sent from the proxy servers back to the IP telephony devices. In this method, the timing interval between successive stay alive messages is adjusted to become longer in those instances where it is possible. A method as illustrated in FIG. 5 could be conducted each time that the IP telephony device conducts a full registration process with a proxy server. Thus, a method as illustrated in FIG. 5 could be the tuning step which appears as step S303 of the method illustrated in FIG. 3.

The method starts in step S502, where the proxy server receives at least two successive stay alive messages from an IP telephony device. In step S504, the system checks to determine if the same port number is reflected in both stay alive messages. If so, this would mean that the time interval between successive stay alive messages is sufficiently long to prevent the router from closing the pinhole. However, at this point the system would not know whether the IP telephony device is sending successive stay alive messages just fast enough to prevent the pinhole from closing, or if the IP telephony device is sending stay alive messages far more often than is necessary to keep the pinhole open.

Assuming the port numbers were the same during the check performed in step S504, the method proceeds to step S506, where the system instructs the IP telephony device to lengthen the time period between successive stay alive messages.

In step S508, the system waits to receive at least two successive stay alive messages under the new longer timing interval. In step S510 the system again checks to determine if the port number for successive stay alive messages is the same. If so, this would indicate that even the lengthened time period between successive stay alive messages was sufficient to keep the pinhole open. If that is the case, the method loops back to step S506, where the system again instructs the IP telephony device to lengthen the time period between successive stay alive messages. This process would continue until in step S510 it is determined that the port numbers in successive stay alive messages is different. This would indicate that the timing interval being used by the IP telephony device has finally become so long that the stay alive messages are not being sent quickly enough to keep the pinhole alive. At this point, the method moves on to step S512.

In step S512, the system instructs the IP telephony device to decrease the interval between successive stay alive messages. In step S514, the system waits to receive at least two successive stay alive messages that have been sent with the new timing interval.

In step S516, the system checks to determine if the same UDP port is reflected in both stay alive messages. If so, this would indicate that the timing interval has been adjusted to a small enough time period so that the router will no longer close the pinhole between successive stay alive messages. If not, the method loops back to step S512, and the IP telephony device is again instructed to further reduce the timing interval between successive stay alive messages by another small amount. This process continues until the system determines in step S516 that successive stay alive messages reflect the same UDP port, which indicates that the timing interval between successive stay alive messages is short enough to prevent the pinhole from closing.

With a method as illustrated in FIG. 5, each individual IP telephony device can adjust the timing interval between successive stay alive messages to suit the configuration of the router to which it is attached. The interval will be adjusted to be as long as possible, given the characteristics of the router to which it is attached. And because the interval is made as long as possible, unnecessary signaling between the IP telephony device and its proxy server will be reduced, lowering the overhead messaging traffic.

The amount by which the time interval is lengthened in step S506, and the amount by which the interval is shortened in step S512 need not be the same. For instance, the time interval could be lengthened by 5 seconds in step S506, whereas the interval could be shortened by 1 second in step S512, or vice versa.

As explained above, an IP telephony system could include various ways of monitoring the call quality of calls placed between individual IP telephony devices. Typical call quality monitoring would include detecting or calculating packet loss and jitter statistics for individual telephone calls. In some instances, those detected or calculated statistics could be used to take corrective action to improve a user's overall experience. One such method will be discussed with reference to FIGS. 6A-8B.

Figure 6A:
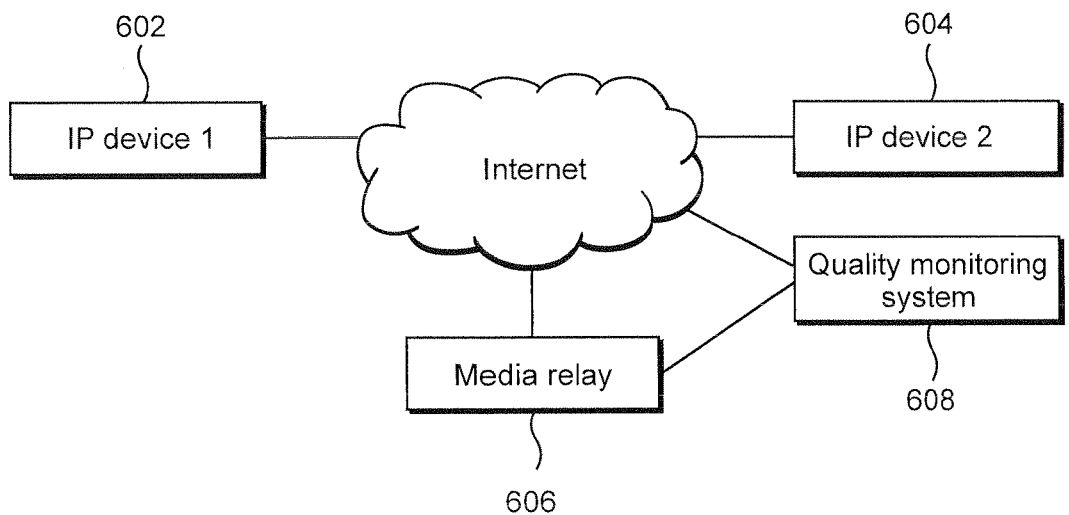
FIG. 6A illustrates elements of a typical VOIP telephony system.

FIG. 6A illustrates elements of an IP telephony system. As shown in FIG. 6A, a first IP telephony device 602 and a second IP telephony device 604 would both be connected to the Internet. In addition, a media relay 606 could also be connected to the Internet. A call quality monitoring system 608 could be connected to the Internet, and also possibly to the media relay 606.

Figure 6B:
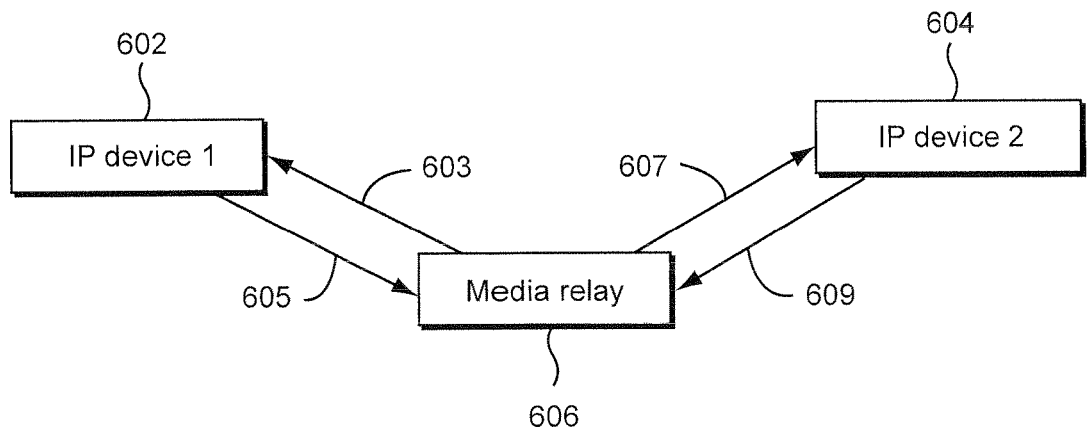
FIG. 6B illustrates the flow path of data communications which can occur between devices in a typical VOIP telephony system.

The data communications paths which exist between the devices illustrated in FIG. 6A are better illustrated in FIG. 6B. As shown in FIG. 6B, when a telephone call has been established between the first IP telephony device 602 and the second IP telephony device 604, the data packets which carry audio (i.e., voice) information specific to that telephone call can pass through a media relay 606. Data packets sent from the first IP telephony device 602 would pass along a first outbound path 605 to the media relay 606. The media relay 606 would then send those data packets along a second inbound path 607 between the media relay 606 and the second IP telephony device 604. Data packets sent from the second IP telephony device 604 to the media relay 606 would pass along a second outbound path 609. Those data packets would then be communicated from the media relay 606 to the first IP telephony device 602 along a first inbound path 603.

Because a quality monitoring system 608 is connected to the media relay 606, the quality monitoring system is able to monitor the data packet communications on both the first and second inbound paths and the first and second outbound paths, all of which pass through the media relay 606. As a result, it is possible to obtain data packet loss and jitter statistics for each of these four transmission legs.

Figure 7:
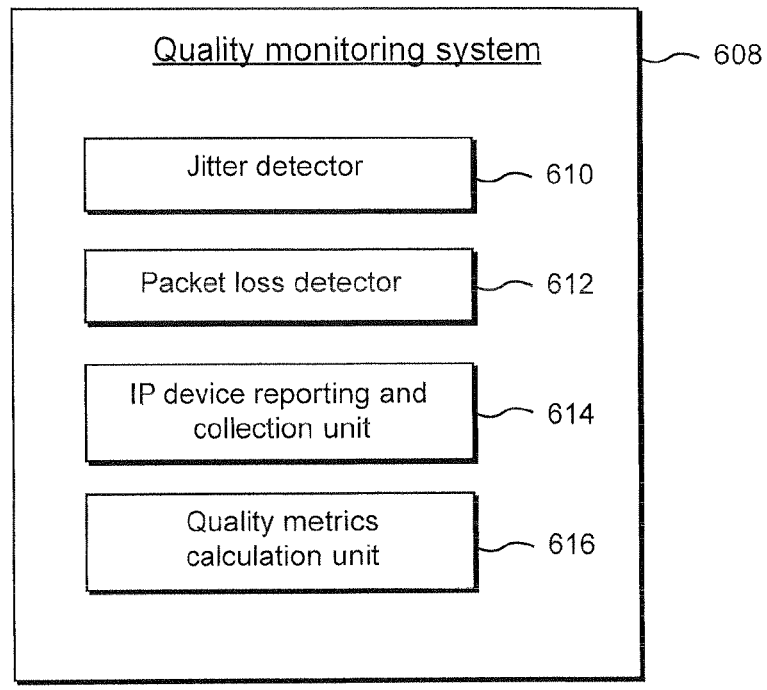
FIG. 7 is a block diagram illustrating elements of a quality monitoring system which can be used in a VOIP telephony system.

The quality monitoring system 608 is illustrated in greater detail in FIG. 7. As shown therein, the quality monitoring system can include a jitter detector 610, a packet loss detector 612, and an IP telephony device reporting and collection unit 614. A quality metrics calculation unit 616 could calculate averages of any of these statistics or the quality metrics calculation unit 616 could generate call quality metrics which are based upon multiple ones of the detected values.

The IP telephony device reporting and collection unit 614 can collect information from the IP telephony devices themselves. For instance, the IP telephony devices could also detect and report packet loss and jitter statistics. The IP telephony devices might also report when they are forced to discard a data packet because it has been received so far out of order that it cannot be used in an audio stream.

Although the above discussion focused on jitter and packet loss, a variety of other data packet communication statistics could also be detected and calculated.

IP telephony devices use an encoding algorithm to convert an audio stream into digital data packets, and to convert the data in digital data packets back into an audio stream. Different encoding algorithms operate in different fashions. Some encoding algorithms utilize data compression techniques to send an audio stream in as few data packets as possible. When an encoding algorithm uses data compression techniques, the audio quality is typically somewhat degraded. However, the use of data compression techniques makes it possible to transmit a particular audio stream using less bandwidth than an encoding algorithm that does not use data compression techniques.

In instances where there is insufficient bandwidth for an IP telephony device to conduct a high quality voice call, it may be possible to conduct the call with slightly degraded audio quality if the IP telephony device employs an encoding algorithm using data compression techniques. Although the audio quality may suffer slightly as a result of the data compression, it is usually the case that the deterioration in the audio quality caused by the data compression will be less than the deterioration which occurs if no compression is used and data packets are simply being lost.

In those situations where the available bandwidth is continuously insufficient for an IP telephony device to conduct a high quality call without data compression, it would be desirable to cause the IP telephony device to begin using an encoding algorithm with compression techniques. However, in those instances where the amount of available bandwidth is almost always sufficient to conduct a high quality call without data compression, but where it sporadically becomes insufficient, it may make sense to continue conducting calls with an encoding algorithm that does not use data compression techniques. This ensures that almost all of the time, the calls are conducted at the highest possible quality. In addition, where sporadic bandwidth problems occur, even if the IP telephony device converted to the use of an encoding algorithm with data compression technology, the use of the compression technology might not solve the problem. In other words, switching the IP telephony device over to an encoding algorithm that uses data compression techniques may not be of any help in solving a problem which is caused by another device periodically using almost all of the available bandwidth.

Figure 8A:
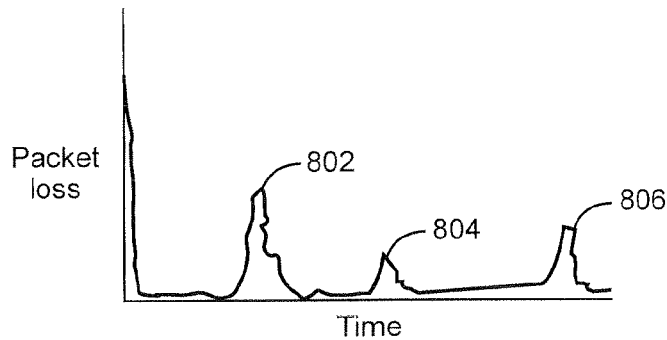
FIG. 8A illustrates packet loss which occurs over time during a VOIP telephone call.
Figure 8B:
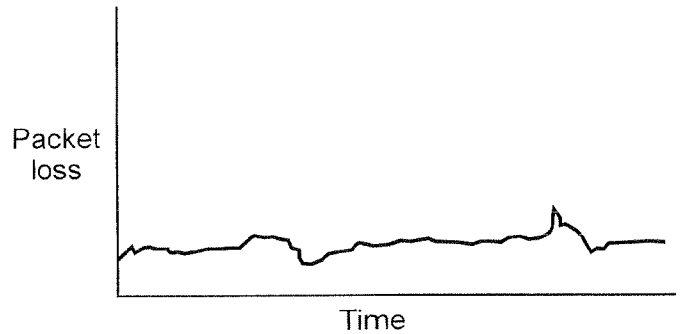
FIG. 8B illustrates packet loss which occurs over time during a different VOIP telephone call.

In order to distinguish between these two different situations, one can look at the packet loss and/or jitter statistics for a particular IP telephony device. FIGS. 8A and 8B illustrate the packet loss which occurs in these two different situations during calls conducted by an IP telephony device.

FIG. 8A illustrates a situation where another device which is sharing access to a broadband Internet connection sporadically uses a portion of the available bandwidth. As illustrated in FIG. 8A, the packet loss increases sharply and then decreases again as the other device consumes and then releases a percentage of the available bandwidth. Accordingly, there are only three distinct points in time 802, 804, 806 where the packet loss is large enough to impact voice communications through the IP telephony device.

FIG. 8B illustrates a different situation where the packet loss is relatively constant over time. This indicates that the available bandwidth is simply insufficient for the IP telephony device to conduct a high quality voice telephone call without the use of compression techniques.

The quality monitoring system 608 would monitor the packet loss or jitter statistics for telephone calls in an attempt to distinguish between these two different situations. If it appears that the situation is as illustrated in FIG. 8B, where the available bandwidth is simply insufficient, then the quality monitoring system could instruct the IP telephony device to begin to use data compression. As explained above, this might degrade the call quality slightly, but the degradation in the call quality will still be less than the degradation which occurs due to the packet loss when no data compression is being used.

Although FIGS. 8A and 8B illustrate packet loss which occurs during a telephone call, jitter statistics could be used in place of packet loss. In alternate embodiments, both packet loss and jitter statistics could be used together to determine when it may be desirable to cause an IP telephony device to switch to an encoding algorithm that uses data compression techniques. Moreover, in alternate embodiments, statistics on data communications other than packet loss and jitter could be used.

Figure 9:
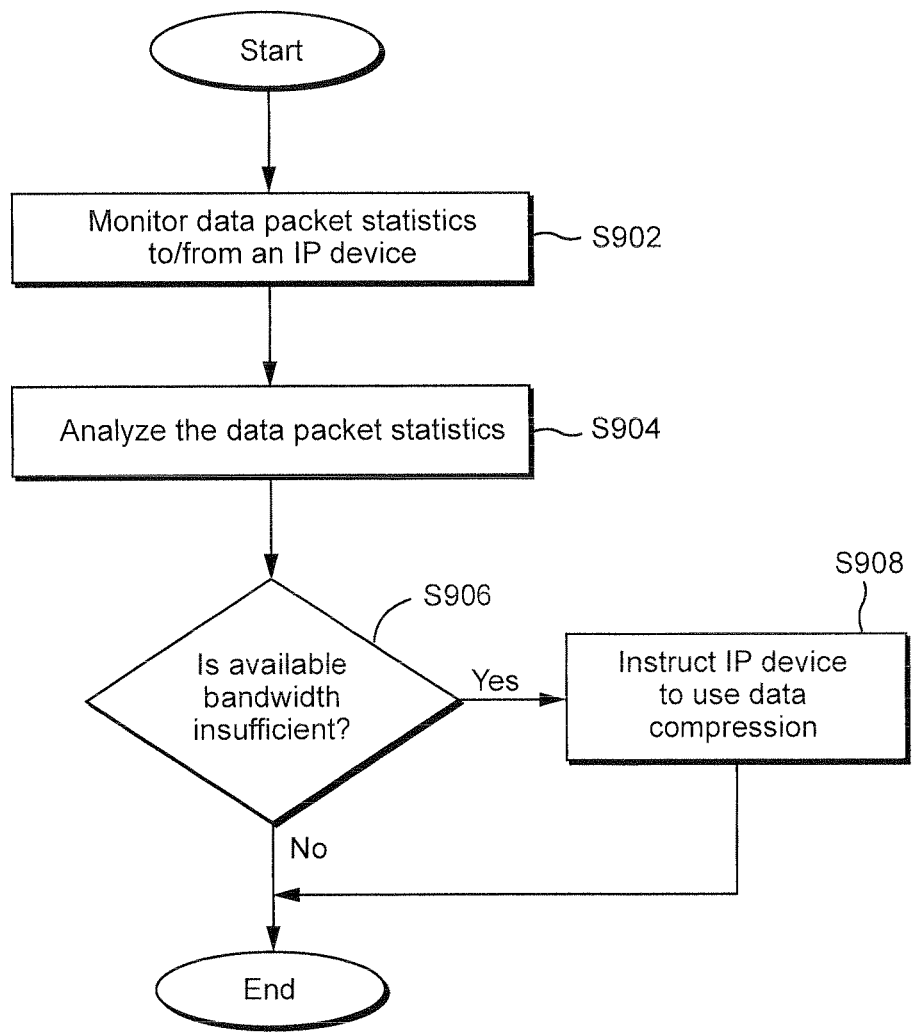
FIG. 9 illustrates steps of a method of taking corrective action to correct a call quality problem in a VOIP telephony system.

A method of monitoring data packet communication statistics and taking corrective action is illustrated in FIG. 9. As shown therein, in a first step S902, the data packet statistics for data packets communicated to and/or from an IP telephony device are monitored over a period of time. In step S904, those data packet communication statistics are analyzed to determine certain trends. In step S906, if the analysis indicates that the bandwidth available to the IP telephony device is simply insufficient on a relatively continuous basis, the method proceeds to step S908. In step S908, the IP telephony device is instructed to begin using an encoding algorithm with data compression techniques. The method would then end. On the other hand, if in step S906 it was determined that the available bandwidth is sufficient, or that it only becomes insufficient on an intermittent or sporadic basis, the method would simply end.

Jitter statistics provide a measure of how far out of sequence data packets are being received at a destination device. When a first IP telephony device converts an audio stream into data packets, the data packets are provided with sequence numbers. The numbered data packets are then sent to a second IP telephony device. Because of the way data packets traverse the Internet, it is common for the data packets to arrive at the second IP telephony device out of sequence. The second IP telephony device uses the sequence numbers to place the data packets back into the proper order, and then the data within the packets is used to re-create the audio stream.

Most IP telephony devices maintain a buffer for incoming data packets. The use of a buffer allows a receiving IP telephony device time to place the incoming data packets back into the proper order before the data packets are used to re-create the audio stream. However, if delivery of a data packet is considerably delayed, it may arrive too late to be placed in the proper sequence with the other data packets. In these instances, the late data packet is typically discarded. When the data packets are used to re-create the audio stream, because a data packet is missing, the audio stream will not be perfect. The worse the jitter problem becomes, the more the audio quality will be degraded.

As noted above, one expects that some data packets will arrive out of sequence, and the buffer for the incoming data packets is designed to help overcome this problem. Audio quality is only impacted if the jitter problem has become bad enough that data packets are being received so late that they cannot be inserted back into the stream at the proper location. One way of compensating for a bad jitter problem is to increase the size of the buffer. If the buffer is larger, it gives the receiving IP telephony device more time to get the data packets reassembled into the proper order before the data packets are used to re-create the audio stream.

Of course, maintaining the buffer consumes memory resources. The larger the buffer becomes, the more memory is required. Also, one real world consequence of maintaining the buffer is that re-creation of the audio stream is delayed. If the buffer becomes larger, the delay becomes larger. If the buffer becomes too large, then the delay will become noticeable to the two people conducting a telephone call.

One way of helping to maintain the quality of a VOIP telephone call is to monitor the jitter statistics for data packets passing between two IP telephony devices. If the jitter statistics indicate that the data packets are arriving at an IP telephony device so far out of sequence that call quality is suffering, then the system can instruct the IP telephony device to increase the size of the buffer to try to help overcome the problem. The degree to which the buffer is increased can be based upon how bad the jitter problem appears to be, as reflected in the jitter statistics.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. In a voice over Internet protocol (VOIP) telephony system, a method of instructing an Internet protocol (IP) telephony device to take an action to correct a potential problem related to registration of the IP telephony device based on the IP address associated with the IP telephony device, comprising:
analyzing data communications passing between an IP telephony device and one or more elements of an IP telephony system;
determining if two successive stay alive registration requests sent from the IP telephony device originate from different IP addresses; and
instructing the IP telephony device to re-initialize itself if the two successive stay alive registration requests originate from different IP addresses thereby registering a current IP address with the IP telephony system.

2. The method of claim 1, wherein the analyzing step further comprises determining if the IP telephony device is conducting a full registration process with one or more proxy servers of the IP telephony system more frequently than necessary.

3. The method of claim 2, wherein if the IP telephony device is conducting the full registration process with the one or more proxy servers of the IP telephony system more frequently than necessary, the instructing step comprises instructing the IP telephony device to re-initialize itself.

4. The method of claim 2, wherein if the IP telephony device is conducting the full registration process with the one or more proxy servers of the IP telephony system more frequently than necessary, the instructing step comprises instructing the IP telephony device to re-initialize itself at a particular point in time.

5. The method of claim 1, wherein if two successive stay alive registration requests sent from the IP telephony device originate from different IP addresses, the instructing step comprises instructing the IP telephony device to conduct a full registration process with a proxy server of the IP telephony system.

6. The method of claim 1, wherein the analyzing step further comprises determining if two successive stay alive registration requests sent from the IP telephony device originate from different ports of a router.

7. The method of claim 6, wherein if two successive stay alive registration requests sent from the IP telephony device originate from different ports of a router, the instructing step comprises instructing the IP telephony device to send stay alive registration requests more frequently.

8. In a voice over Internet protocol (VOIP) telephony system, a method of instructing an Internet protocol (IP) telephony device to take an action to correct a potential problem, comprising:
analyzing data communications passing between an IP telephony device and one or more elements of an IP telephony system to determine if a measure of data packet communication errors experienced by the IP telephony device exceeds a threshold value for more than a predetermined period of time; and
instructing the IP telephony device to switch from the use of a first encoding algorithm to the use a second encoding algorithm which utilizes greater data compression than the first encoding algorithm if the measure of data packet communication errors exceeds the threshold value for more than the predetermined period of time.

9. The method of claim 8, wherein the measure of data packet communication errors comprises a measure of data packet jitter.

10. The method of claim 8, wherein the measure of data packet communication errors comprises a measure of data packet loss.

11. The method of claim 8, wherein the predetermined period of time is approximately three seconds.

12. The method of claim 8, wherein the measure of data packet communication errors comprises a measure of data packets that are out of sequence.

13. The method of claim 8, wherein the second encoding algorithm causes the data communications to use less bandwidth using the second encoding algorithm than the data communications using the first encoding algorithm.

14. The method of claim 8, wherein audio data in the data packet communication using the second encoding algorithm is of a lower quality than audio data in the data packet communication using the first encoding algorithm.

15. The method of claim 8, wherein video data in the data packet communication using the second encoding algorithm is of a lower quality than video data in the data packet communication using the first encoding algorithm.

16. The method of claim 8, wherein the IP telephony device is instructed to switch from using the first encoding algorithm to using the second encoding algorithm when an average value of the measured data packet communication errors over the period of time is below a specified threshold.

17. The method of claim 8, wherein the IP telephony device is instructed to switch from using the first encoding algorithm to using the second encoding algorithm when the measured data packet communication errors at one or more points in time over the period of time fall below a specified threshold.

18. The method of claim 8, wherein
the IP telephony device is configured to receive data packets, in a buffer memory of the IP telephony device, from another device, and
each data packet having a sequence number assigned to the data packet thereby allowing the IP telephony device to put each data packet into a proper sequence of data packets.

19. The method of claim 18, wherein the IP telephony device expands a size of the buffer memory when a level of data packet jitter and/or a level of data packet loss in the received data packets exceeds a threshold value.

20. The method of claim 19, wherein the size of the buffer corresponds to the level of data packet jitter and/or the level of data packet loss in the received data packets.

21. A method of adjusting the frequency at which an Internet protocol (IP) telephony device periodically sends stay alive registration messages to a proxy server of a voice over Internet protocol (VOIP) telephony system to keep the IP telephony device within a pinhole communication window of the proxy server, comprising:
(a) instructing an IP telephony device to increase a delay between the periodic transmission of stay alive registration messages it is sending;
(b) identifying which port of a router the IP telephony device is associated based on the transmitted stay alive registration message;
(c) repeating steps (a) and (b) until two successive stay alive registration messages sent from the IP telephony device originate from different ports of a router;

(d) instructing the IP telephony device to decrease the delay between the periodic transmission of stay alive registration messages it is sending; and (e) repeating step (d) until two successive stay alive messages sent from the IP telephony device originate from the same port of a router.

22. The method of claim 21, wherein the amount by which the IP telephony device is instructed to increase the delay in step (a) is greater than the amount by which the IP telephony device is instructed to decrease the delay in step (d).

23. A method of stopping an Internet protocol (IP) telephony device from jumping between proxy servers of a voice over Internet protocol (VOIP) telephony system, comprising:

determining if an IP telephony device is conducting a full registration process with one or more proxy servers of a VOIP telephony system more frequently than required by the VOIP telephony system based on a number of registration attempts the IP telephony device has conducted within a specified period of time; and instructing the IP telephony device to take corrective action when the number of registration attempts the IP telephony device has conducted within the specified period of time exceeds a threshold value.

24. The method of claim 23, wherein the instructing step comprises instructing the IP telephony device to re-initialize itself.

* * * * *